US008549314B2

(12) United States Patent
Mahmoud Abd Alla et al.

(10) Patent No.: US 8,549,314 B2
(45) Date of Patent: Oct. 1, 2013

(54) PASSWORD GENERATION METHODS AND SYSTEMS

(75) Inventors: Hanan Ahmed Hossni Mahmoud Abd Alla, Riyadh (SA); Khaled Soliman Alghathbar, Riyadh (SA)

(73) Assignee: King Saud University, Riyadh (SA)

( * ) Notice: Subject to any disclaimer, the term of this patent is extended or adjusted under 35 U.S.C. 154(b) by 500 days.

(21) Appl. No.: 12/770,717

(22) Filed: Apr. 29, 2010

(65) Prior Publication Data

US 2011/0271118 A1    Nov. 3, 2011

(51) Int. Cl.
G06F 21/00    (2006.01)
(52) U.S. Cl.
USPC .............. 713/183; 713/170; 713/184; 726/19
(58) Field of Classification Search
USPC ............................ 713/170, 183–184; 726/19
See application file for complete search history.

(56) References Cited

U.S. PATENT DOCUMENTS

| | | |
|---|---|---|
| 4,815,031 A | 3/1989 | Furukawa |
| 4,942,606 A | 7/1990 | Kaiser et al. |
| 4,959,860 A | 9/1990 | Watters et al. |
| 5,012,514 A | 4/1991 | Renton |
| 5,097,506 A | 3/1992 | Kaiser, Jr. et al. |
| 5,161,184 A | 11/1992 | Smith et al. |
| 5,166,979 A | 11/1992 | Takayama et al. |
| 5,173,940 A | 12/1992 | Lantz et al. |
| 5,265,163 A | 11/1993 | Golding et al. |
| 5,313,639 A | 5/1994 | Chao |
| 5,388,156 A | 2/1995 | Blackledge, Jr. et al. |
| 5,428,529 A | 6/1995 | Hartrick et al. |
| 5,430,867 A | 7/1995 | Gunji |
| 5,537,544 A | 7/1996 | Morisawa et al. |
| 5,581,700 A | 12/1996 | Witte |
| 5,664,099 A | 9/1997 | Ozzie et al. |
| 5,704,040 A | 12/1997 | Gunji |
| 5,751,812 A | 5/1998 | Anderson |
| 5,768,503 A | 6/1998 | Olkin |
| 5,781,725 A | 7/1998 | Saito |
| 5,793,951 A | 8/1998 | Stein et al. |
| 5,796,943 A | 8/1998 | Fujioka |
| 5,799,145 A | 8/1998 | Imai et al. |
| 5,812,764 A | 9/1998 | Heinz, Sr. |
| 5,832,214 A | 11/1998 | Kikinis |
| 5,838,903 A | 11/1998 | Blakely, III et al. |
| 5,845,066 A | 12/1998 | Fukuzumi |
| 5,875,296 A | 2/1999 | Shi et al. |
| 5,884,026 A | 3/1999 | Kong |
| 5,892,906 A | 4/1999 | Chou et al. |
| 5,911,042 A | 6/1999 | Kugue |
| 5,923,841 A | 7/1999 | Lee |
| 5,931,948 A | 8/1999 | Morisawa et al. |
| 5,949,882 A | 9/1999 | Angelo |
| 5,960,084 A | 9/1999 | Angelo |

(Continued)

FOREIGN PATENT DOCUMENTS

CA    2210763 C    7/1997

*Primary Examiner* — Yin-Chen Shaw
*Assistant Examiner* — Fahimeh Mohammadi
(74) *Attorney, Agent, or Firm* — Hart IP Law & Strategies

(57) ABSTRACT

Password generation and extraction is described. In one aspect, a user inputs multiple characters, including a user password, variable characters, and multiple terminator characters. Locations of the terminator characters are identified and used to extract the user password from the multiple characters input by the user.

17 Claims, 7 Drawing Sheets

(56) References Cited

U.S. PATENT DOCUMENTS

| | | |
|---|---|---|
| 5,963,142 A | 10/1999 | Zinsky et al. |
| 5,983,349 A | 11/1999 | Kodama et al. |
| 5,983,352 A | 11/1999 | Kong |
| 6,006,334 A | 12/1999 | Nguyen et al. |
| 6,041,413 A | 3/2000 | Wang |
| 6,044,470 A | 3/2000 | Kuriyama |
| 6,065,081 A | 5/2000 | Stancil et al. |
| 6,069,953 A | 5/2000 | Kong |
| 6,108,790 A | 8/2000 | Moriya et al. |
| 6,111,956 A | 8/2000 | Field et al. |
| 6,121,962 A | 9/2000 | Hwang |
| 6,125,457 A | 9/2000 | Crisan et al. |
| 6,128,742 A | 10/2000 | Felt |
| 6,131,164 A | 10/2000 | Parker |
| 6,138,240 A | 10/2000 | Tran et al. |
| 6,145,053 A | 11/2000 | Smith |
| 6,145,085 A | 11/2000 | Tran et al. |
| 6,148,403 A | 11/2000 | Haneda et al. |
| 6,161,178 A | 12/2000 | Cromer et al. |
| 6,161,185 A | 12/2000 | Guthrie et al. |
| 6,166,716 A | 12/2000 | Kashino |
| 6,175,926 B1 | 1/2001 | Fogle |
| 6,178,508 B1 | 1/2001 | Kaufman |
| 6,182,225 B1 | 1/2001 | Hagiuda et al. |
| 6,189,100 B1 | 2/2001 | Barr et al. |
| 6,199,077 B1 | 3/2001 | Inala et al. |
| 6,202,161 B1 | 3/2001 | Wang |
| 6,205,554 B1 | 3/2001 | Sasaki et al. |
| 6,209,103 B1 | 3/2001 | Schreiber et al. |
| 6,216,229 B1 | 4/2001 | Fischer |
| 6,237,100 B1 | 5/2001 | Cromer et al. |
| 6,240,519 B1 | 5/2001 | James, Jr. et al. |
| 6,243,816 B1 | 6/2001 | Fang et al. |
| 6,266,654 B1 | 7/2001 | Schull |
| 6,266,774 B1 | 7/2001 | Sampath et al. |
| 6,278,993 B1 | 8/2001 | Kumar et al. |
| 6,324,648 B1 | 11/2001 | Grantges, Jr. |
| 6,333,684 B1 | 12/2001 | Kang |
| 6,341,352 B1 | 1/2002 | Child et al. |
| 6,360,326 B1 | 3/2002 | Hiles |
| 6,363,465 B1 | 3/2002 | Toda |
| 6,363,486 B1 | 3/2002 | Knapton, III |
| 6,366,957 B1 | 4/2002 | Na |
| 6,370,650 B1 | 4/2002 | Cromer et al. |
| 6,397,337 B1 | 5/2002 | Garrett et al. |
| 6,408,389 B2 | 6/2002 | Grawrock et al. |
| 6,412,073 B1 | 6/2002 | Rangan |
| 6,438,584 B1 | 8/2002 | Powers |
| 6,446,115 B2 | 9/2002 | Powers |
| 6,460,139 B1 | 10/2002 | Heinrich et al. |
| 6,467,049 B1 | 10/2002 | Robins et al. |
| 6,470,454 B1 | 10/2002 | Challener et al. |
| 6,470,455 B1 | 10/2002 | Cromer et al. |
| 6,477,647 B1 | 11/2002 | Venkatraman et al. |
| 6,487,465 B1 | 11/2002 | Dayan et al. |
| 6,510,522 B1 | 1/2003 | Heinrich et al. |
| 6,512,463 B1 | 1/2003 | Campbell et al. |
| 6,539,482 B1 | 3/2003 | Blanco et al. |
| 6,546,491 B1 | 4/2003 | Challener et al. |
| 6,584,564 B2 | 6/2003 | Olkin et al. |
| 6,594,766 B2 | 7/2003 | Rangan et al. |
| 6,665,800 B1 | 12/2003 | Jaber |
| 6,687,836 B1 | 2/2004 | Butler |
| 6,718,467 B1 | 4/2004 | Trostle |
| 6,725,382 B1 | 4/2004 | Thompson et al. |
| 6,725,425 B1 | 4/2004 | Rajan et al. |
| 6,731,731 B1 | 5/2004 | Ueshima |
| 6,738,877 B1 | 5/2004 | Yamakawa et al. |
| 6,742,129 B1 | 5/2004 | Higgs et al. |
| 6,745,332 B1 | 6/2004 | Wong et al. |
| 6,745,334 B1 | 6/2004 | Ikegami |
| 6,757,825 B1 | 6/2004 | MacKenzie et al. |
| 6,760,843 B1 | 7/2004 | Carter |
| 6,760,844 B1 | 7/2004 | McCarthy et al. |
| 6,779,121 B1 | 8/2004 | Uchida et al. |
| 6,792,547 B1 | 9/2004 | Murata et al. |
| 6,801,935 B2 | 10/2004 | Shen |
| 6,802,042 B2 | 10/2004 | Rangan et al. |
| 6,823,452 B1 | 11/2004 | Doyle et al. |
| 6,823,463 B1 | 11/2004 | Challener et al. |
| 6,823,464 B2 | 11/2004 | Cromer et al. |
| 6,826,686 B1 | 11/2004 | Peyravian et al. |
| 6,826,700 B1 | 11/2004 | Germscheid et al. |
| 6,834,112 B1 | 12/2004 | Brickell |
| 6,842,782 B1 | 1/2005 | Malik et al. |
| 6,859,212 B1 | 2/2005 | Kumar et al. |
| 6,868,499 B1 | 3/2005 | Buckle |
| 6,871,286 B1 | 3/2005 | Cagle et al. |
| 6,871,288 B2 | 3/2005 | Russikoff |
| 6,880,085 B1 | 4/2005 | Balczewski et al. |
| 6,895,514 B1 | 5/2005 | Kermani |
| 6,898,711 B1 | 5/2005 | Bauman et al. |
| 6,901,145 B1 | 5/2005 | Bohannon et al. |
| 6,918,044 B1 | 7/2005 | Robins et al. |
| 6,938,168 B1 | 8/2005 | Gomez et al. |
| 6,944,822 B1 | 9/2005 | Schreiber et al. |
| 6,950,949 B1 | 9/2005 | Gilchrist |
| 6,954,862 B2 * | 10/2005 | Serpa ............... 726/5 |
| 6,959,394 B1 | 10/2005 | Brickell et al. |
| 6,966,004 B1 | 11/2005 | Jin et al. |
| 6,983,381 B2 | 1/2006 | Jerdonek |
| 6,993,666 B1 | 1/2006 | Hokkanen et al. |
| 7,024,690 B1 | 4/2006 | Young et al. |
| 7,055,032 B2 | 5/2006 | Sandhu et al. |
| 7,055,042 B1 | 5/2006 | Gough et al. |
| 7,062,655 B2 | 6/2006 | Nelson et al. |
| 7,065,786 B2 | 6/2006 | Taguchi |
| 7,073,068 B2 | 7/2006 | Jakobsson et al. |
| 7,085,997 B1 | 8/2006 | Wu et al. |
| 7,093,282 B2 | 8/2006 | Hillhouse |
| 7,100,054 B2 | 8/2006 | Wenisch et al. |
| 7,103,912 B2 | 9/2006 | Xia et al. |
| 7,114,080 B2 | 9/2006 | Rahman et al. |
| 7,139,917 B2 | 11/2006 | Jablon |
| 7,149,311 B2 | 12/2006 | MacKenzie et al. |
| 7,158,954 B2 | 1/2007 | Schull |
| 7,165,267 B1 | 1/2007 | Utsumi et al. |
| 7,178,025 B2 | 2/2007 | Scheidt et al. |
| 7,178,096 B2 | 2/2007 | Rangan et al. |
| 7,185,358 B1 | 2/2007 | Schreiber et al. |
| 7,200,577 B2 | 4/2007 | Zissimopoulos et al. |
| 7,200,804 B1 | 4/2007 | Khavari et al. |
| 7,210,167 B2 | 4/2007 | Brezak et al. |
| 7,213,261 B1 | 5/2007 | Gomez et a |
| 7,222,312 B2 | 5/2007 | Ferguson et al. |
| 7,222,363 B2 | 5/2007 | Rice et al. |
| 7,228,417 B2 | 6/2007 | Roskind |
| 7,249,103 B2 | 7/2007 | Schull |
| 7,249,260 B2 | 7/2007 | Moffat et al. |
| 7,254,831 B2 | 8/2007 | Saunders et al. |
| 7,272,722 B2 | 9/2007 | Legros et al. |
| 7,272,851 B2 | 9/2007 | Gomez et al. |
| 7,294,056 B2 | 11/2007 | Lowell et al. |
| 7,308,261 B2 | 12/2007 | Henderson et al. |
| 7,310,814 B2 | 12/2007 | Morita et al. |
| 7,313,813 B2 | 12/2007 | Rangan et al. |
| 7,325,144 B2 | 1/2008 | Irisawa et al. |
| 7,330,837 B2 | 2/2008 | Schull |
| 7,334,215 B2 | 2/2008 | Wyke et al. |
| 7,337,467 B2 | 2/2008 | Veneklase |
| 7,353,205 B2 | 4/2008 | Schull |
| 7,353,207 B2 | 4/2008 | Schull |
| 7,373,517 B1 | 5/2008 | Riggins |
| 7,383,570 B2 | 6/2008 | Pinkas et al. |
| 7,386,887 B2 | 6/2008 | Keohane et al. |
| 7,389,535 B2 | 6/2008 | King et al. |
| 7,395,435 B2 | 7/2008 | Benhammou et al. |
| 7,409,705 B2 | 8/2008 | Ueda et al. |
| 7,418,596 B1 | 8/2008 | Carroll et al. |
| 7,418,727 B2 | 8/2008 | Lin et al. |
| 7,430,756 B2 | 9/2008 | Smith |
| 7,430,758 B2 | 9/2008 | Toutonghi |
| 7,434,061 B2 | 10/2008 | Montenegro et al. |
| 7,434,062 B2 | 10/2008 | Erez |

| Patent | Type | Date | Inventor |
|---|---|---|---|
| 7,447,903 | B2 | 11/2008 | Sandhu et al. |
| 7,448,085 | B1 | 11/2008 | Reyes et al. |
| 7,451,322 | B2 | 11/2008 | Lee |
| 7,467,403 | B2 | 12/2008 | Harris |
| 7,472,177 | B2 | 12/2008 | Bose |
| 7,478,421 | B2 | 1/2009 | Kodimer et al. |
| 7,484,241 | B2 | 1/2009 | Challener et al. |
| 7,500,106 | B2 | 3/2009 | Herberth |
| 7,503,062 | B2 | 3/2009 | Wong et al. |
| 7,522,723 | B1 | 4/2009 | Shaik |
| 7,523,318 | B2 | 4/2009 | Goal et al. |
| 7,526,798 | B2 | 4/2009 | Chao et al. |
| 7,540,022 | B2 | 5/2009 | Barari et al. |
| 7,549,161 | B2 | 6/2009 | Poo et al. |
| 7,552,467 | B2 | 6/2009 | Lindsay |
| 7,555,463 | B2 | 6/2009 | Schull |
| 7,555,783 | B2 | 6/2009 | Enright |
| 7,558,795 | B2 | 7/2009 | Malik et al. |
| 7,574,739 | B2 * | 8/2009 | Shirakawa ................... 726/19 |
| 7,590,857 | B2 | 9/2009 | Sumio |
| 7,594,120 | B2 | 9/2009 | Brown et al. |
| 7,599,493 | B2 | 10/2009 | Sandhu et al. |
| 7,600,119 | B2 | 10/2009 | Takano |
| 7,619,544 | B2 | 11/2009 | Piwonka et al. |
| 7,624,278 | B2 | 11/2009 | Paden et al. |
| 2008/0301462 | A1 * | 12/2008 | Dayan et al. ................. 713/184 |
| 2008/0320310 | A1 * | 12/2008 | Florencio et al. ............ 713/184 |
| 2011/0016520 | A1 * | 1/2011 | Cohen et al. ................... 726/19 |

\* cited by examiner

PASSWORD GENERATION METHODS AND SYSTEMS

BACKGROUND

Different types of passwords are used in computing systems to manage user access to those computing systems and other resources. Many existing password techniques, such as the use of static passwords, are susceptible to unauthorized access given enough time and/or access attempts. Additionally, these existing password techniques are often prone to "shoulder surfing", eavesdropping, phishing attacks, keystroke monitoring, malicious software attacks, and the like.

By constantly altering a user's password (e.g., using a one-time password), the risk of unauthorized access is reduced. Existing types of one-time passwords use algorithms to change passwords after each use or provide time synchronization between an authentication server and a client providing the password. However, these existing one-time passwords remain vulnerable to certain types of attacks if the unauthorized access is attempted soon after the password is updated.

SUMMARY

The described systems and methods relate to password generation and extraction in a computing environment. A specific method of extracting a password receives multiple characters input by a user. The multiple characters include a user password, variable characters, and multiple terminator characters. The method identifies the location of the terminator characters in the multiple characters and extracts the user password from the multiple characters based on the location of the terminator characters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

The systems and methods described herein relate to the generation of passwords and the extraction of passwords from a string of characters in a computing environment. When entering a password, a user enters characters associated with an actual password as well as additional variable characters (also referred to as "random characters") and several terminator characters. The variable characters and terminator characters are mixed in with the actual password characters to conceal the actual password and decrease the risk of unauthorized use of the password. The variable characters are typically different each time the user enters the string of characters, thereby producing one-time passwords.

Particular examples discussed herein use numerical characters for passwords, variable characters, and terminator characters. However, the present invention can utilize any type of character (such as alphanumeric characters) or symbol to represent passwords, variable characters, and terminator characters.

An Exemplary System for Generating and Extracting Passwords

Figure 1:
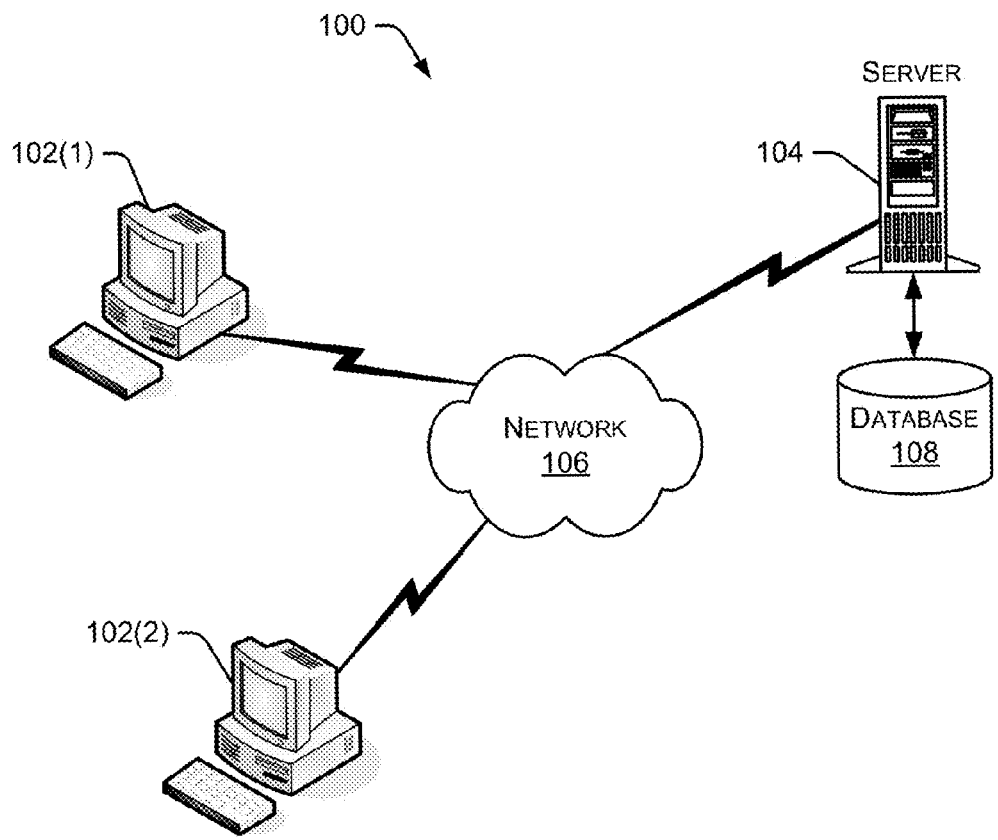
FIG. 1 illustrates an example environment capable of implementing the systems and methods described herein.

FIG. 1 illustrates an example environment 100 capable of implementing the systems and methods described herein. Environment 100 includes two computing systems 102(1) and 102(2), and a server 104 that communicate with one another via a data communication network 106. Computing systems 102(1) and 102(2) represent any type of computing device, such as a server, workstation, laptop computer, tablet computer, handheld computing device, smart phone, personal digital assistant, game console, set top box, and the like. As discussed herein, computing systems 102(1) and 102(2) receive and process strings of characters from one or more users that contain an actual password. Computing systems 102(1) and 102(2) also perform additional functions such as validating passwords, communicating password data to server 104, executing application programs that require user password data, and so forth.

Server 104 is also capable of performing various functions related to password data and strings of characters entered by a user. In certain embodiments, server 104 performs password validation and other functions, the results of which are communicated to one or more computing systems 102. Server 104 is coupled to a database 108 for storing various information, such as password-related information. In particular implementations, database 108 stores strings of characters entered by one or more users, as well as actual passwords extracted from those strings of characters. Database 108 also stores data, instructions, and other information used by, or generated by, server 104. In alternate embodiments, database 108 is coupled directly to data communication network 106 instead of, or in addition to, being coupled to server 104.

Data communication network 106 represents any type of network, such as a local area network (LAN), wide area network (WAN), or the Internet. In particular embodiments, data communication network 106 is a combination of multiple networks communicating data using various protocols across any communication medium.

Although one server (104) and two computing systems (102) are shown in FIG. 1, alternate embodiments may include any number of servers and any number of computing systems coupled via any number of data communication networks 106 and/or communication links. In other embodiments, server 104 is replaced with any other type of computing device or replaced with a group of computing devices.

An Exemplary Procedure for Generating and Extracting Passwords

Figure 2:
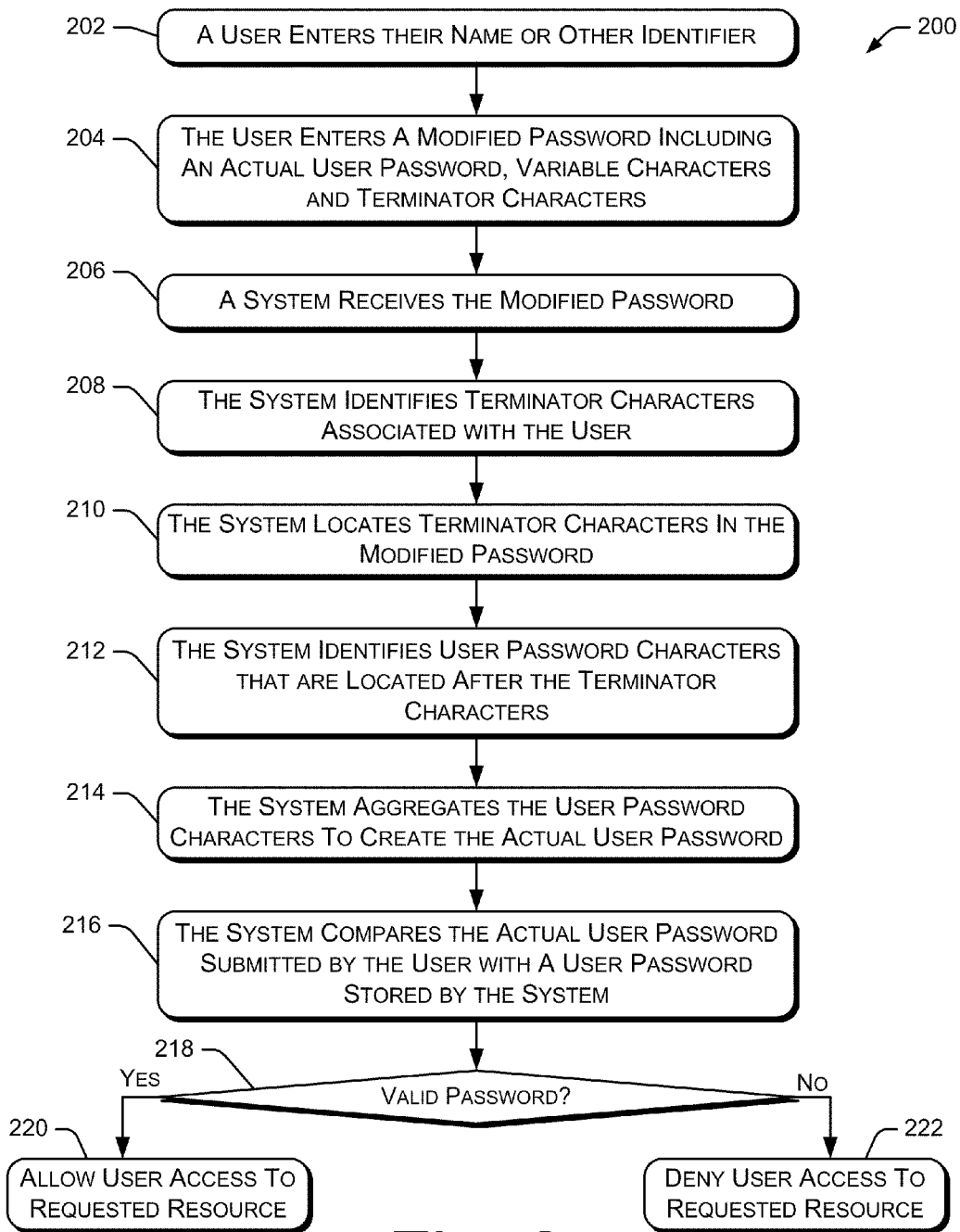
FIG. 2 shows an example procedure for receiving data and extracting a password embedded within that data, according to one embodiment.

FIG. 2 shows an example procedure 200 for receiving data and extracting a password embedded within that data, according to one embodiment. In this example, the received data is a string of characters entered or otherwise provided by a user, such as a user of computing system 102 shown in FIG. 1. In one embodiment, the procedure of FIG. 2 is performed as part of a user validation process prior to executing an application program or permitting access to a restricted resource. Initially, a user enters their name (e.g., a user name associated with an application program or web site) or other identifier (block 202). The user then enters a string of characters (also referred to as a "modified password" or a "noisy password") that includes an actual user password as well as variable characters and terminator characters (block 204). An exemplary modified password is discussed below with respect to FIG. 3. The modified password itself cannot be used to access a system or resource. Instead, the actual user password must be extracted from the modified password and provided to the system or resource to obtain access.

Procedure 200 continues as a system (such as a computing system) receives the modified password (block 206). The system then identifies terminator characters associated with the user (block 208). These terminator characters are received and stored by the system during a user registration procedure (e.g., the same time the user registers their user name and password with the system). The system then locates the multiple terminator characters in the modified password (block 210). Once the terminator characters are located, the system identifies user password characters that are located after the terminator characters (block 212). In one embodiment, a password character is located immediately following each terminator character.

The system aggregates the user password characters to create the actual user password (block 214), which is also a string of characters. The system then compares the actual user password submitted by the user with a user password stored by the system (block 216), such as the password entered by the user during the user registration process. If the password is valid, the user is allowed access to the requested resource (block 220), such as a software application or web site. If the password is not valid, the user is denied access to the requested resource (block 222). If the user is denied access to the requested resource, the procedure may generate and communicate a message to the user indicating the denial of access.

Figure 3:
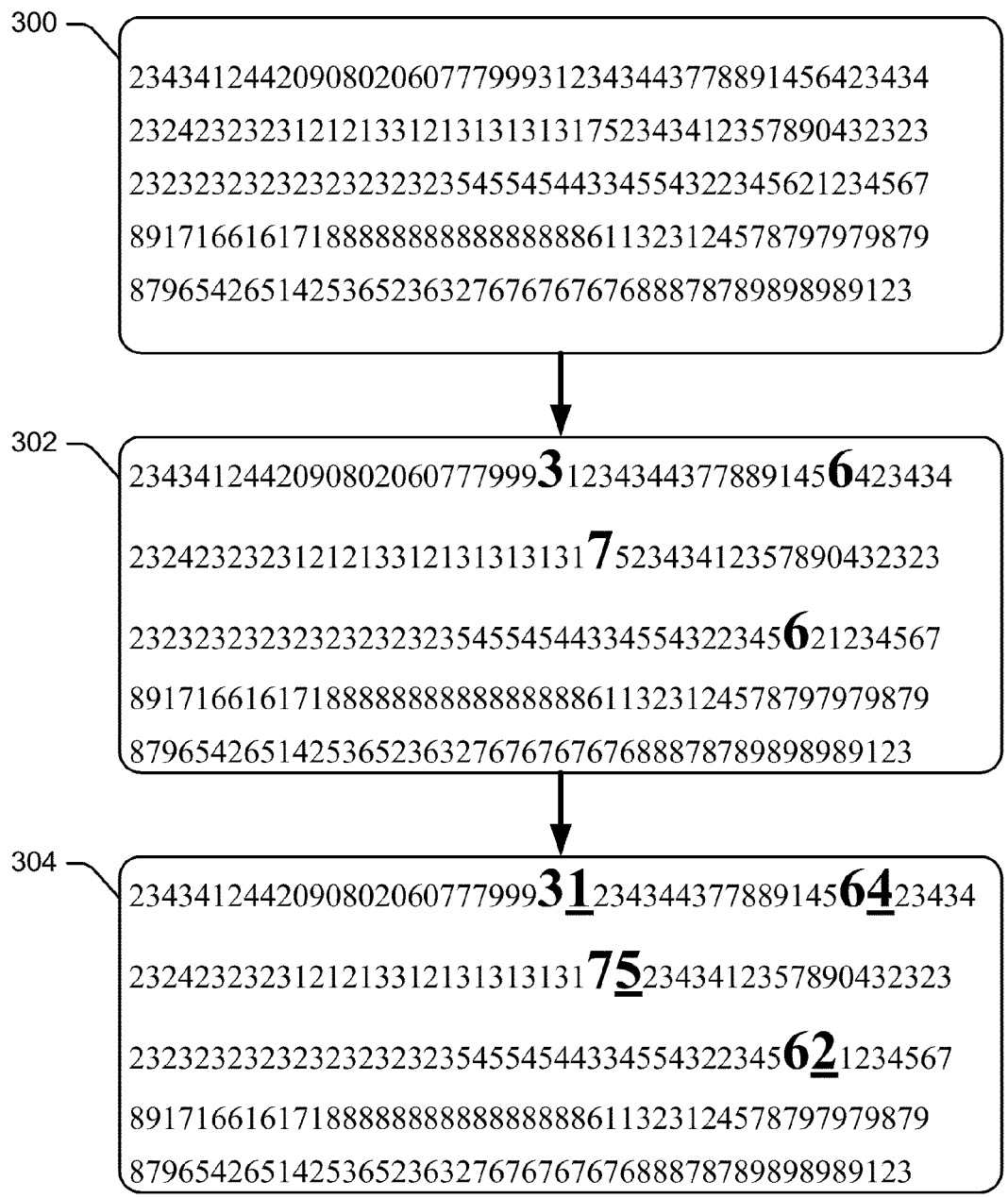
FIG. 3 shows an example of a modified password and the process of identifying an actual user password embedded within the modified password, according to one embodiment.

FIG. 3 shows an example of a modified password and the process of identifying an actual user password embedded within the modified password, according to one embodiment. The modified password has four parts: a fixed portion (called F) that is the actual user password, a variable portion (called V) entered by the user between each character in the actual user password, a terminator portion (called X), and a safeguard (called S). The fixed portion F is defined by the user and typically ranges from four to eight characters in length. The variable portion V is entered by the user when entering the modified password, and can be a string of random characters other than one of the terminator characters, as discussed below. As used herein, the "variable portion" may also be referred to as "variable characters" or "random characters". The terminator characters X denote the end of a particular variable portion and are used to identify the characters in the actual user password. The number of terminator characters corresponds to the number of characters in the actual user password. The safeguard S is a number that represents the minimum number of variable characters V the user is instructed to insert after each character in the actual user password.

In the example of FIG. 3, the actual user password is "1452", the terminator characters are "3676", and the safeguard number S is "5". The character string discussed with respect to FIG. 3 also contains multiple random characters (the variable characters V). The safeguard is used to prevent unauthorized use of the modified password string. As discussed below, if someone copies the entire modified password and attempts to use the modified password to access a restricted resource, the system will not validate the modified password. Subsequent uses of the same modified password are rejected because they fail to include the unique (e.g., random) variable characters V. In a particular embodiment, the modified password includes an initial string that is at least S characters long, followed by the variable characters (V). In this embodiment, the initial string of at least S characters can include any character, including terminator characters. This initial string of at least S characters is not analyzed to locate terminator characters or actual user password characters. That analysis begins after the first S characters (e.g., starting with character "S+1" in the modified password). Similarly, the analysis ignores the first S characters after each actual user password character F.

Box 300 in FIG. 3 shows an example string of characters (a modified password) entered by a user. This string of characters includes the actual user password (1452) embedded with many other characters to conceal the actual password from unauthorized individuals or systems. The string of characters in box 300 is analyzed to find the four terminator characters (3676). Box 302 highlights the position of the four terminator characters. These terminator characters are identified by locating the first terminator character (3), followed by the second terminator character (6), then the third terminator character (7), and the fourth terminator character (6). The positions of the four terminator characters are shown by enlarging the specific terminator characters. Since the terminator characters are specific indicators of the positions of the actual user password characters, the user needs to avoid including terminator characters in the variable (random) character portion of the modified password. Otherwise, the procedure may incorrectly identify one of the variable characters as a terminator character. However, as noted above, an initial string of at least S characters can include any character, including terminator characters. This initial string of at least S characters is not analyzed to locate terminator characters or actual user password characters. Thus, the character "3", which is the first terminator character, that is located in the second and fourth position of the first line in box 302 is ignored because it is within the first five (S=5 in this example) characters. The procedure begins looking for the first terminator character (3) after the first five characters in the modified password. Similarly, the procedure ignores the first five characters after each actual user password character F.

After identifying the four terminator characters, the actual password is identified by locating the value of the character immediately following each of the terminator characters. The four characters representing the actual password (1452) are shown as enlarged and underlined characters in block 304. After extracting the actual password, the remaining characters in the character string are not necessary. The safeguard number, mentioned above, identifies a length of the variable characters V that is included by the user immediately following each character of the actual user password. In the example of FIG. 3, the safeguard number is five, indicating that at least five variable characters follows each character of the actual password.

In a particular implementation, the length of the actual password is between four and eight characters. To ensure security of the data, the user is not prompted in the login screen to enter the additional characters (variable characters, terminator characters, and safeguard data). It is the user's responsibility to add the additional characters in a manner that follows the rules associated with the password system. If the user fails to follow these rules, the resulting password extraction procedure may extract the wrong data. In the above example, when entering the modified password, the user first entered the five safeguard characters followed by variable (random) characters, which are followed by the first termination character "3". After the first termination character, the user entered the first actual password character "1", then the five safeguard characters and the additional variable (random) characters, followed by the second termination character "6", and so forth.

In the above procedure, the user needs to remember two pieces of information: the actual user password and the terminator characters. There is no need to remember the variable (random) characters entered into the modified password. These variable characters are used to conceal the actual user password and discourage unauthorized access to the protected system or resource. The user can change their actual user password and/or the termination characters at regular intervals to enhance the security provided by the systems and methods described herein.

Figure 4:
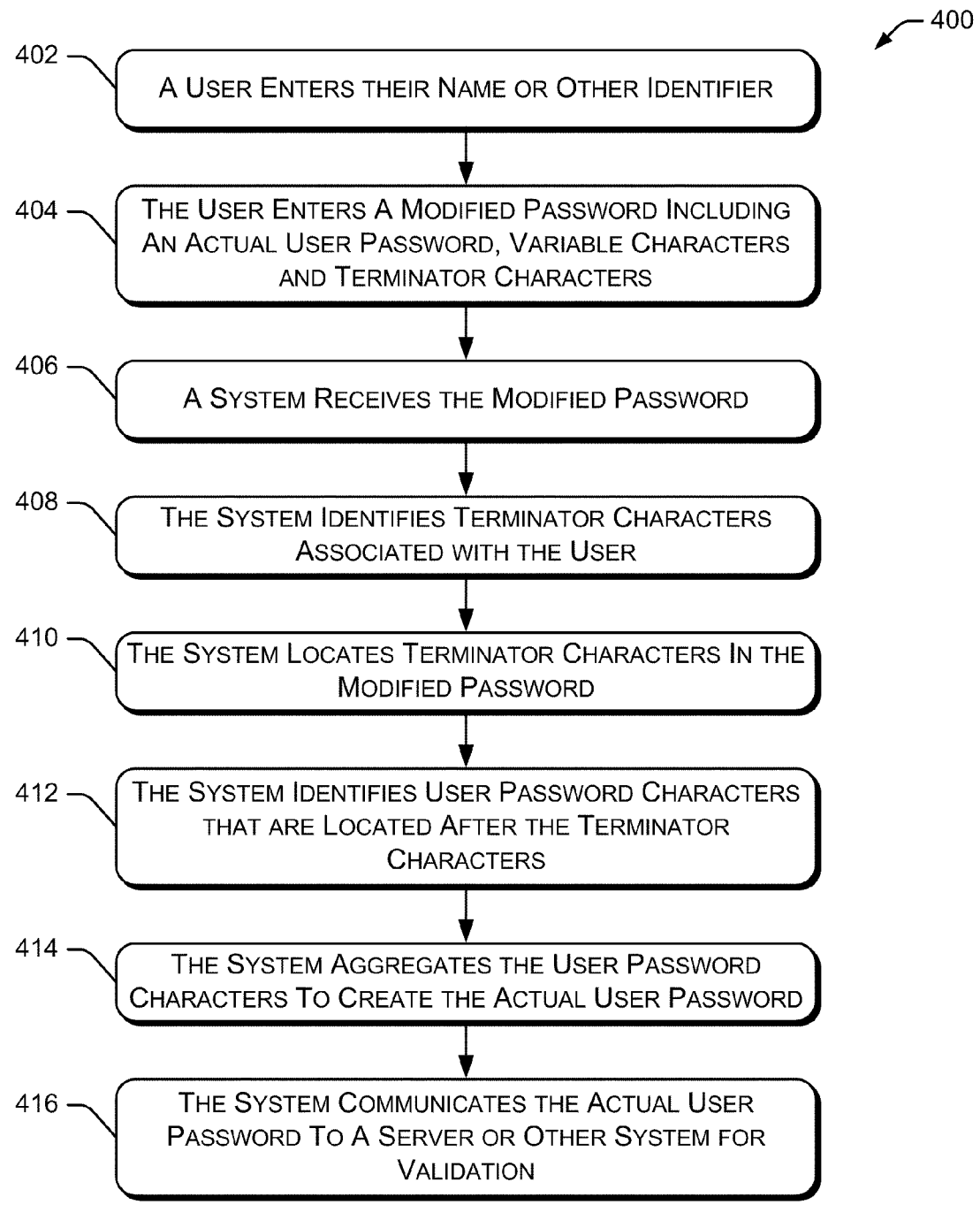
FIG. 4 shows an example procedure for extracting a password from received data and communicating the extracted password to a server for validation, according to one embodiment.

FIG. 4 shows an example procedure 400 for extracting a password from received data and communicating the extracted password to a server for validation, according to one embodiment. A user enters their name or other identifier (block 402). The user also enters a modified password including an actual user password, variable characters, and terminator characters (block 404). The system receives the modified password (block 406) and identifies terminator characters associated with the user (block 408). The system then locates terminator characters in the modified password (block 410). The system then identifies user password characters that are located after the terminator characters (block 412) and aggregates the user password characters to create the actual user password (block 414). Finally, the system communicates the actual user password to a server or other system for validation (block 416). In certain embodiments, the server or other system performing the password validation procedure communicates an indication of whether the password was validated back to the system receiving the modified password from the user.

Figure 5:
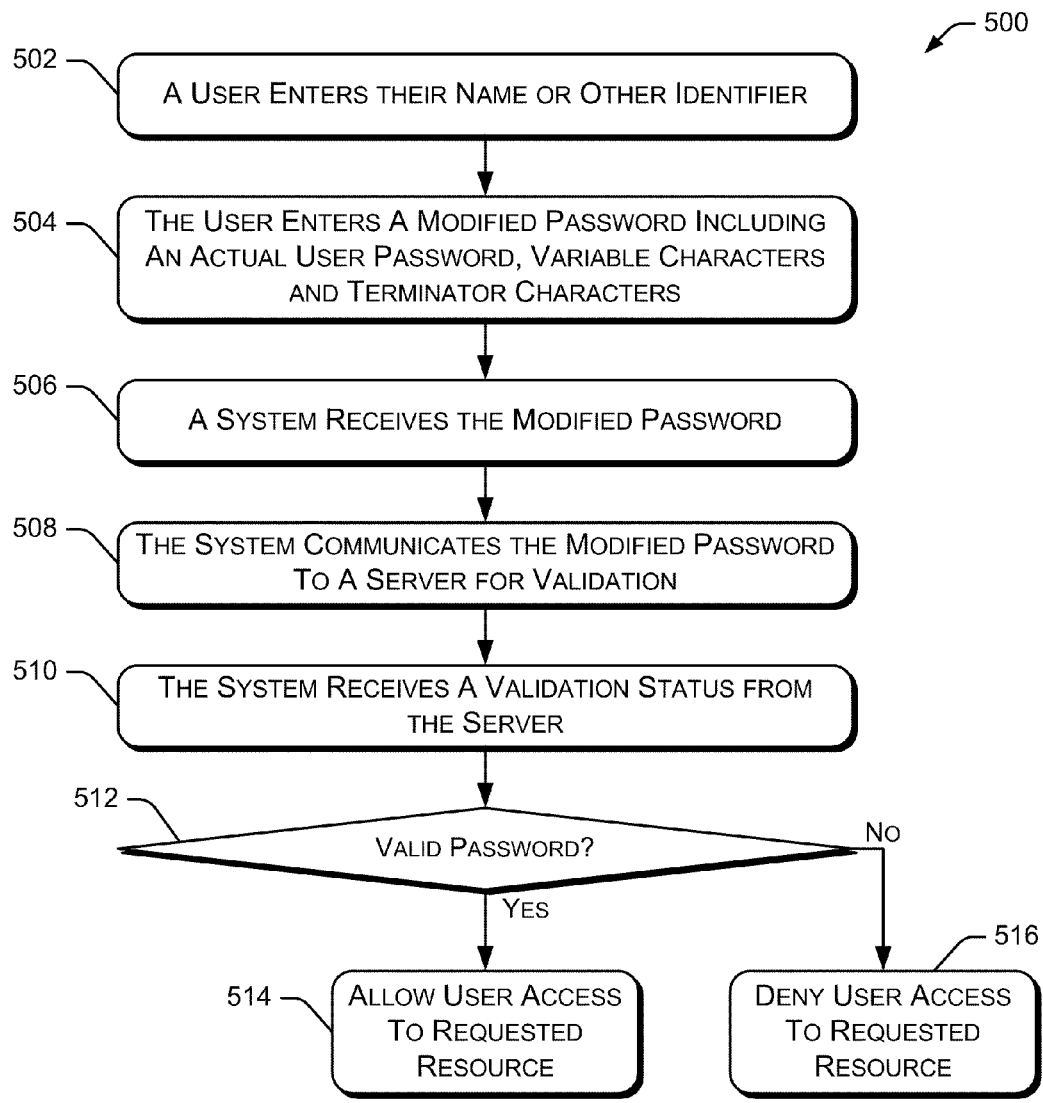
FIG. 5 shows an example procedure for receiving data and communicating the data to a server for extraction of a password from the data and validation of the extracted password, according to one embodiment.

FIG. 5 shows an example procedure 500 for receiving data and communicating the data to a server for extraction of a password from the data and validation of the extracted password, according to one embodiment. Initially, a user enters their name or other identifier (block 502). The user also enters a modified password including an actual user password, variable characters, and terminator characters (block 504). The system receives the modified password (block 506) and communicates the modified password to a server for validation (block 508). After the server processes the modified password, the server receives a validation status from the server (block 510), indicating whether the modified password contained a valid actual user password. If the password is valid, the user is allowed access to the requested resource (block 514). Otherwise, the user is denied access to the requested resource (block 516).

Figure 6:
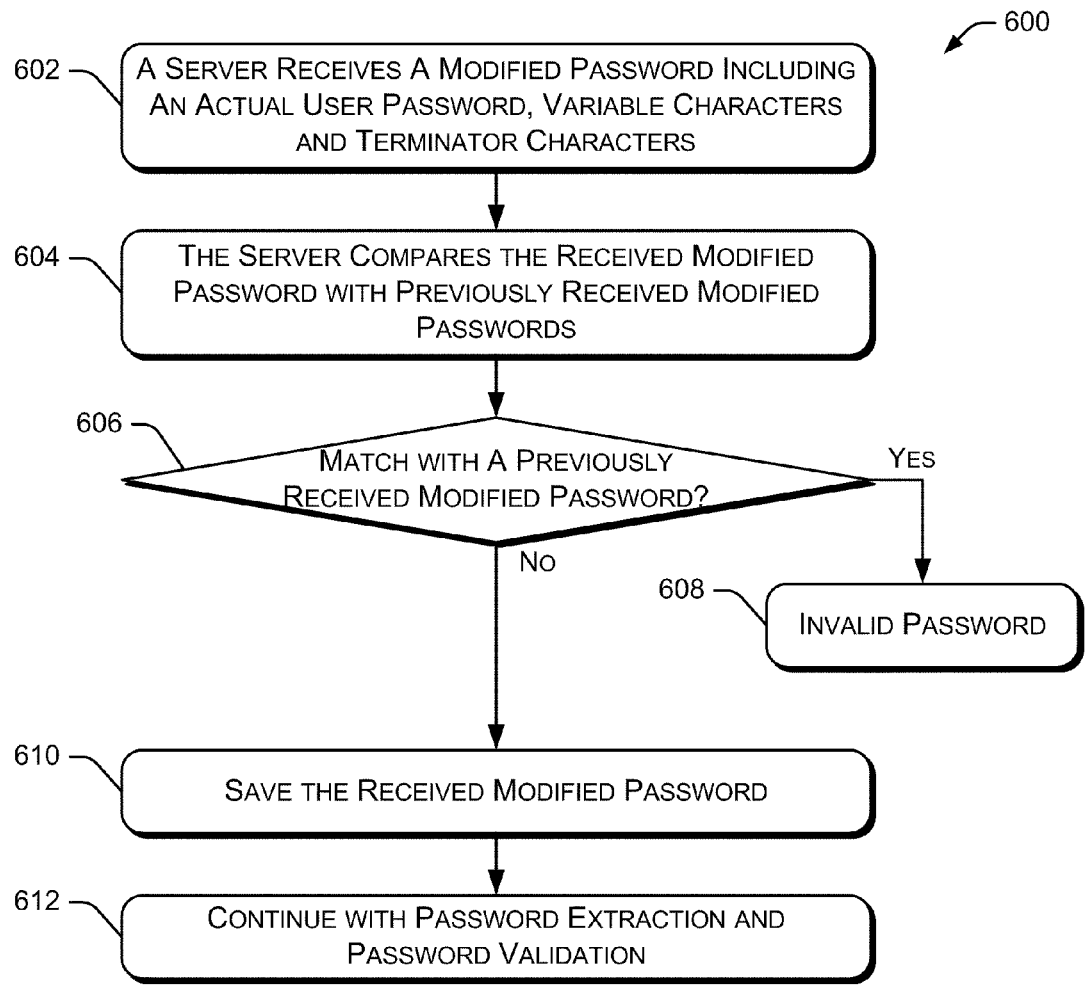
FIG. 6 shows an example procedure for preventing repeated use of a set of data containing an embedded password, according to one embodiment.

FIG. 6 shows an example procedure 600 for preventing repeated use of a set of data containing an embedded password, according to one embodiment. Since a user is adding different variable (random) characters to each modified password, the likelihood that two modified passwords will contain identical strings of characters is very unlikely. When a modified password is received that is identical to a previously received password, the system assumes that the received modified password is from an unauthorized user that somehow gained access to a previously submitted password. In this situation, the system wants to prevent the suspected unauthorized access.

Referring to procedure 600, a server receives a modified password including an actual user password, variable characters, and terminator characters (block 602). The server compares the received modified password with previously received modified passwords (block 604). If the received modified password matches any of the previously received modified passwords, the received modified password is considered an invalid password (block 608). Otherwise, the received modified password is saved by the server (block 610) and the procedure continues by extracting the actual user password and validating the actual user password (block 612).

Figure 7:
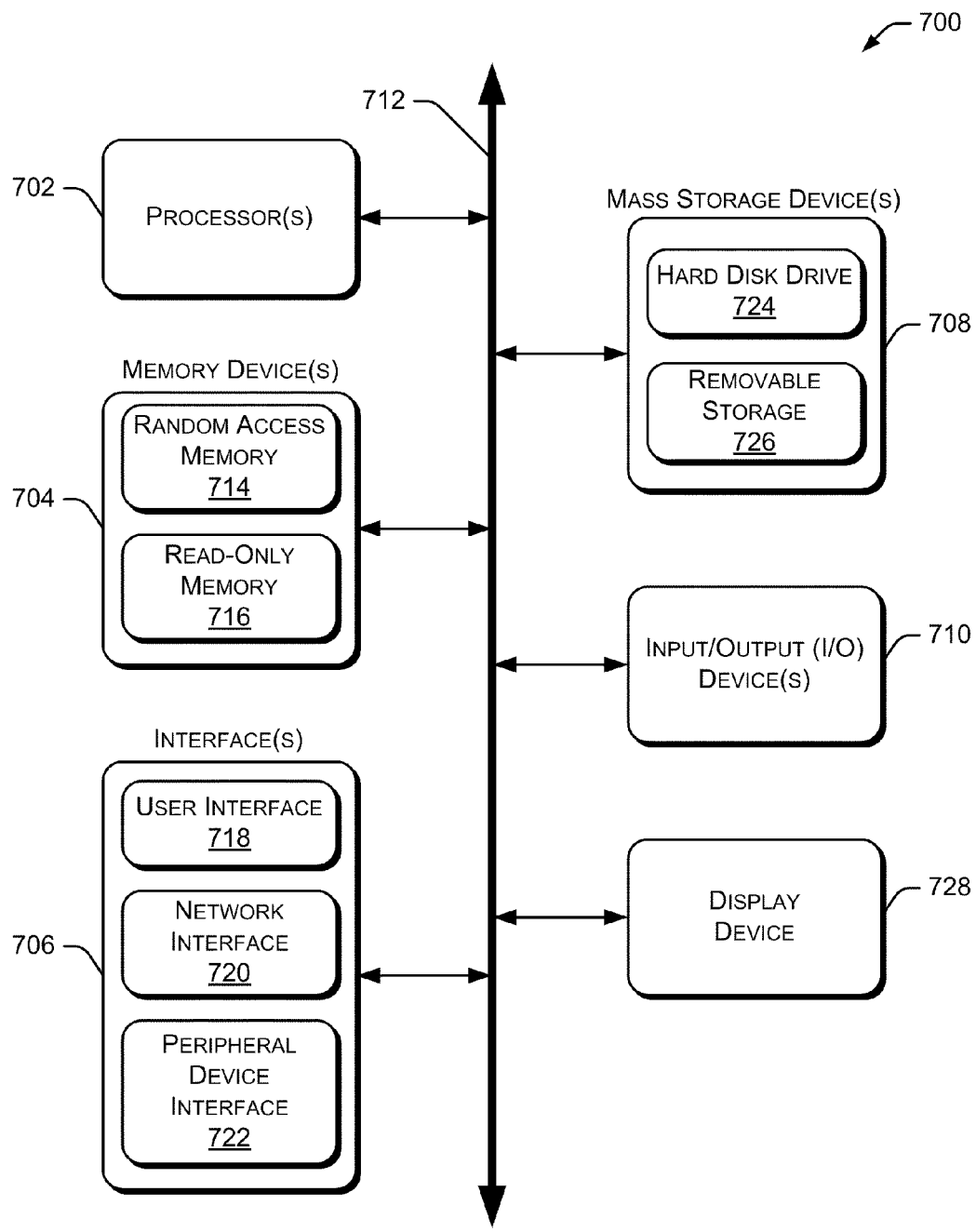
FIG. 7 is a block diagram illustrating an exemplary computing device, according to one embodiment.

FIG. 7 is a block diagram illustrating an exemplary computing device 700. Computing device 700 may be used to perform various procedures, such as those discussed herein. Computing device 700 can function as a server, a client, a worker node, or any other computing entity. Computing device 700 can be any of a wide variety of computing devices, such as a desktop computer, a notebook computer, a server computer, a handheld computer, and the like.

Computing device 700 includes one or more processor(s) 702, one or more memory device(s) 704, one or more interface(s) 706, one or more mass storage device(s) 708, one or more Input/Output (I/O) device(s) 710, and a display device 728, all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) 714 and/or nonvolatile memory (e.g., read-only memory (ROM)) 716. Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 728 includes any type of device capable of displaying information to one or more users of computing device 700. Examples of display device 728 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interfaces include user interface 718 and peripheral device interface 722.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application-specific integrated circuits (ASICs) can be programmed to carry out one or more of the systems and procedures described herein.

Conclusion

Although the systems and methods for password generation and extraction have been described in language specific to structural features and/or methodological operations or actions, it is understood that the implementations defined in the appended claims are not necessarily limited to the specific features or actions described. Rather, the specific features and operations of data encryption and data communication are disclosed as exemplary forms of implementing the claimed subject matter.

The invention claimed is:

1. A computer-implemented method comprising:
   receiving a plurality of characters input to a computer device by a user, wherein the plurality of characters input by the user include a user password, variable characters, a plurality of terminator characters, and wherein the plurality of characters input by the user further include a plurality of safeguard characters;
   identifying locations of the plurality of terminator characters, each one of the terminator characters separated from one another by a portion of the variable characters; and
   extracting the user password from the plurality of characters which included the user password, variable character, the plurality of terminator characters, and the plurality of safeguard characters, wherein the safeguard is number that presents the minimum number of variable characters the user enter after each character in the actual user password and followed by variable characters and terminator characters; input by the user based on a one-to-one correspondence of each character of the user password with each one of the terminator characters and the locations of each one of the terminator characters.

2. A computer-implemented method as recited in claim 1 wherein extracting the user password from the plurality of characters input by the user includes:
   identifying a plurality of characters associated with the terminator; and
   identifying a plurality of user password characters adjacent to the plurality of characters associated with the terminator.

3. A computer-implemented method as recited in claim 2 wherein extracting the user password from the plurality of characters input by the user further includes aggregating the plurality of user password characters to create the user password.

4. A computer-implemented method as recited in claim 1 wherein the plurality of characters input by the user further include a plurality of safeguard characters immediately following each of the user password characters.

5. A computer-implemented method as recited in claim 1 wherein the number of variable characters is associated with a safeguard value.

6. A computer-implemented method as recited in claim 1 further comprising validating the user password.

7. A computer-implemented method as recited in claim 1 further comprising communicating the user password to a server for validation.

8. A computer-implemented method as recited in claim 1 further comprising:
   communicating the user password to a server for validation; and
   receiving validation information from the server indicating whether the user password is valid.

9. A computer-implemented method as recited in claim 1 further comprising communicating the plurality of characters input by the user to a server for storage of the plurality of characters.

10. A computer-implemented method as recited in claim 1 wherein the plurality of characters input by the user represent a single use password.

11. A computer-implemented method comprising: receiving a string of characters input to a computer device by a user, wherein the string of characters include:
    a user password having a plurality of characters;
    a plurality of variable characters;
    a plurality of terminator characters, each one of the terminator characters separated from one another by a portion of the variable characters; and
    a plurality of safeguard characters;
    identifying locations of the plurality of terminator characters; and
    extracting the user password from the string of characters which included the user password, variable character, the plurality of terminator characters, and the plurality of safeguard characters, wherein the safeguard is number that presents the minimum number of variable characters the user enter after each character in the actual user password and followed by variable characters and terminator characters; based on a one-to-one correspondence of each character of the user password with each one of the terminator characters and the locations of each one of the terminator characters.

12. A computer-implemented method as recited in claim 11 wherein extracting the user password from the string of characters includes:
    identifying a plurality of characters associated with the terminator; and
    identifying a plurality of user password characters adjacent to the plurality of characters associated with the terminator.

13. A computer-implemented method as recited in claim 12 wherein extracting the user password from the string of characters further includes aggregating the plurality of user password characters to create the user password.

14. A computer-implemented method as recited in claim 11 wherein the plurality of safeguard characters are located immediately following each of the user password characters.

15. A computer-implemented method as recited in claim 11 wherein the plurality of safeguard characters are located at the beginning of the string of characters input by the user.

16. A computer-implemented method comprising:
   receiving a string of characters input to a computer device by a user, wherein the string of characters input by the user include a user password, variable characters, a plurality of terminator characters, each one of the terminator characters separated from one another by a portion of the variable characters, and wherein the plurality of characters input by the user further include a plurality of safeguard characters;
   identifying a plurality of previously received strings of characters input by a user;
   determining whether any of the previously received strings of characters match the received string of characters;
   invalidating the received string of characters if any of the previously received strings of characters match the received string of characters; and
   extracting the user password from the plurality of characters input by the user which included the user password, variable character, the plurality of terminator characters, and the plurality of safeguard characters, wherein the safeguard is number that presents the minimum number of variable characters the user enter after each character in the actual user password and followed by variable characters and terminator characters based on a one-to-one correspondence of each character of the user password with each one of the terminator characters and the locations of each one of the terminator characters.

17. A computer-implemented method as recited in claim 16 further comprising requesting a different string of characters if any of the previously received strings of characters match the received string of characters.

* * * * *